United States Patent
Hsieh

(10) Patent No.: US 9,415,471 B2
(45) Date of Patent: Aug. 16, 2016

(54) SPRING COMPENSATION STRUCTURE FOR A TORQUE WRENCH AND SPRING COMPENSATING METHOD THEREOF

(71) Applicant: KABO TOOL COMPANY, Taichung (TW)

(72) Inventor: Chih-Ching Hsieh, Taichung (TW)

(73) Assignee: KABO TOOL COMPANY, Taichung (TW)

( * ) Notice: Subject to any disclaimer, the term of this patent is extended or adjusted under 35 U.S.C. 154(b) by 287 days.

(21) Appl. No.: 14/018,445

(22) Filed: Sep. 5, 2013

(65) Prior Publication Data

US 2014/0068906 A1 Mar. 13, 2014

(30) Foreign Application Priority Data

Sep. 10, 2012 (TW) .............................. 101133014 A

(51) Int. Cl.
*B25B 23/142* (2006.01)
*B23P 6/00* (2006.01)
*F16F 1/32* (2006.01)

(52) U.S. Cl.
CPC ............... *B23P 6/00* (2013.01); *B25B 23/1427* (2013.01); *F16F 1/324* (2013.01); *Y10T 29/4973* (2015.01)

(58) Field of Classification Search
CPC ..................... Y10T 29/4973; Y10T 29/49732; B23P 6/00; B25B 23/1427; F16F 1/324
See application file for complete search history.

(56) References Cited

U.S. PATENT DOCUMENTS 1,551,758 A * 9/1925 Lehr ....................... F16K 31/58
137/329.3

* cited by examiner

*Primary Examiner* — Sarang Afzali
*Assistant Examiner* — Ruth G Hidalgo-Hernande
(74) *Attorney, Agent, or Firm* — CKC & Partners Co., Ltd.

(57) ABSTRACT

A spring compensation structure for a torque wrench includes a body, a compensation component and an engaging head. The body has a first connecting portion. The compensation component is installed on the body and has a compensation distance, wherein one end of the compensation component is abutted on the first connecting portion of the body. The engaging head has a second connecting portion; the second connecting portion is detachably disposed on the body and is abutted on the other end of the compensation component, wherein a distance between the second connecting portion and the first connecting portion is equal to the compensation distance.

6 Claims, 4 Drawing Sheets

SPRING COMPENSATION STRUCTURE FOR A TORQUE WRENCH AND SPRING COMPENSATING METHOD THEREOF

RELATED APPLICATIONS

The application claims priority to Taiwan Application Serial Number 101133014, filed on Sep. 10, 2012, which is herein incorporated by reference.

BACKGROUND

1. Technical Field

The present disclosure relates to a torque wrench and a spring compensating method thereof, more particularly relates to a spring compensation structure for a torque wrench and spring compensating method thereof.

2. Description of Related Art

Mechanical parts are becoming more delicate and complicated with the advance of mechanical manufacturing technology. The knowledge on mechanical assembling is also continuingly raising for the people. Not only a machine factory, demand on applying a precise torque to a component is increased for the people who repair by themselves household goods, leisure equipment or vehicles. As such, requirements on the precision of a torque wrench are increasingly high.

The torque wrench is a precision hand tool that can obtain a required torque while engaging with a component. Conventional torque wrench utilizes a spring as a torque sensor; when a torque of the torque wrench reaches a specified value, a deformation of the spring, reaches to a specified value simultaneously. Some of the conventional torque wrenches utilize a trip mechanism for tripping to make a warning sound, and the other ones utilize a display or an indicator to show the torque value or a warning signal when the spring is force taken and deformed.

FIG. 1 is a structural diagram showing a structure of a conventional torque wrench. The torque wrench includes a body 100 and an engaging head 500. The engaging head 500 is located at one end of the body 100 for connecting and applying a torque to a workpiece. The body 100 includes a spring 101 located inside and connected with the engaging head 500. A handle portion 102 is located at outside of the body 100 for gripping with a user. A sensor 103 is connected with the spring 101 for sensing and converting the force taken on the spring 101 to a torque value, and the torque value is displayed on a display panel (not shown).

When the elasticity of the spring is gradually decreased after the use for a period of time, using frequency or using strength, the accuracy of the torque wrench is decreased accordingly. Therefore, the torque value is no longer accurate, and the torque wrench is no longer being useful.

For saving the cost of replacing a new torque wrench, a new kind torque wrench with a calibratable torque value has been developed. When the spring of a torque wrench losses elasticity but other components of the torque wrench work, one conventional method is provided to open the torque wrench and replace the used spring to a new one in order to recover the accuracy of the torque wrench. Another conventional method is provided to add an extra gasket incorporated with the spring for increasing a pre-compression of the spring in order to compensate the elastic fatigue. Some other conventional method is to open the torque wrench and adjust the position of the spring in order to increase the pre-compression of the spring thereby to compensate the elastic fatigue.

However, the conventional methods described above suffer from a shortcoming that opening the torque wrench is required to conduct an adjustment. Therefore, the methods are very complicated in process steps and may have great influences on the original setting, of the components of the torque wrench, thereby leading more difficulty on assembly and calibration of the components. Moreover, since the conventional spring compensation structure has to be maintained directly from the inner structure of the torque wrench, the components involved is complicated and the operation in the maintenance is highly precisely. As a result, the manufacturing process is difficult and the cost of the torque wrench keeps high.

SUMMARY

According to one aspect of the disclosure, a spring compensation structure for a torque wrench is provided. The spring compensation structure includes a body, a compensation component and an engaging head. The body has a first connecting portion. The compensation component is installed on the body and has a compensation distance, wherein one end of the compensation component is abutted on the first connecting portion of the body. The engaging head has a second connecting portion; the second connecting, portion is detachably disposed on the body and is abutted on the other end of the compensation component, wherein a distance between the second connecting portion and the first connecting portion is equal to the compensation distance.

According to another aspect of the disclosure, a spring compensation, structure for a torque wrench is provided. The spring compensation structure includes a body and an engaging head. The body has a first connecting portion. The engaging head has a second connecting portion, the second connecting portion is detachably disposed on the body, and a position of the second connecting portion or the body is adjustable for making a distance between the second connecting portion and the first connecting portion being equal to a compensation distance.

According to still another aspect of the disclosure, a spring compensating method applied to the spring compensation structure is provided. The spring compensating method includes: the engaging head is departed and the second connecting portion and the compensation component are separated; the compensation component is replaced with an another compensation component having a proper compensation distance; the another compensation component is installed to the body and one end of the another compensation component is abutted on the first connecting portion of the body; and the second connecting portion is connected to the body and another end of the another compensation component is abutted on the second connecting portion, and thereby a determined compensation distance is formed between the second connecting portion and the first connecting portion of the body.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
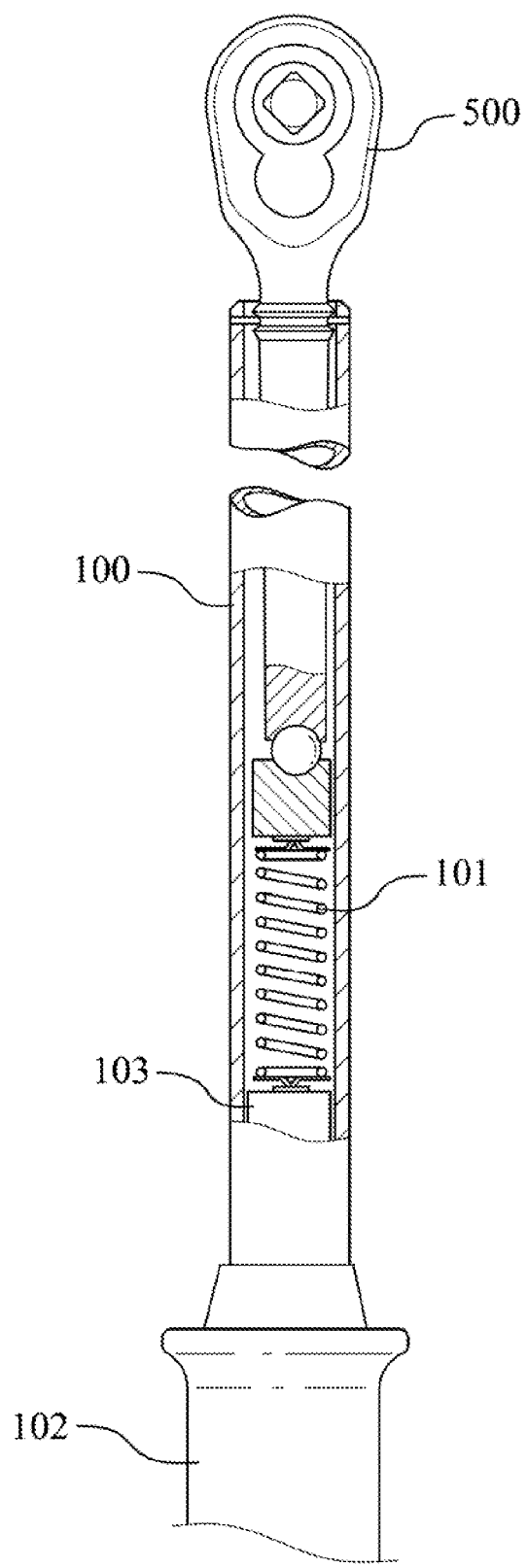
FIG. 1 is a structural diagram showing a structure of a conventional torque wrench.
Figure 2:
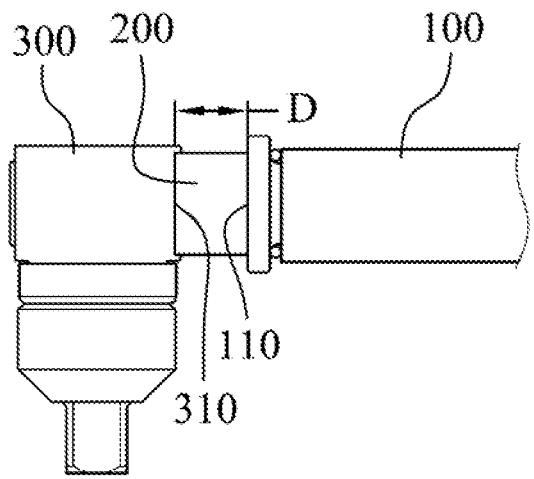
FIG. 2 is a structure diagram showing a spring compensation structure according to one embodiment of the present disclosure.
Figure 3:
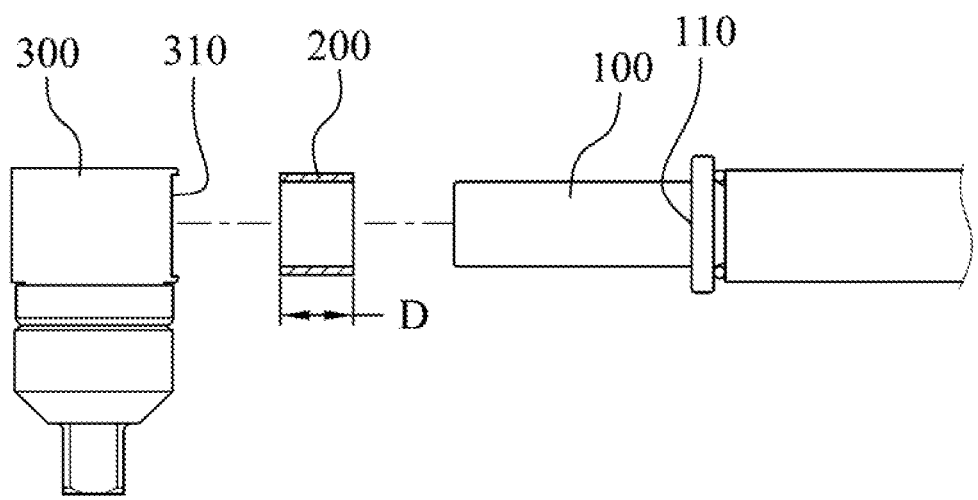
FIG. 3 is a breakdown drawing of the components of FIG. 2.

FIG. 2 is a structure diagram showing a spring compensation structure according to one embodiment of the present disclosure. FIG. 3 is a breakdown drawing of the components of FIG. 2. The spring compensation structure includes a body 100, a compensation component 200 and an engaging head 300. The body 100 includes a first connecting portion 110. The body 100 is jacketed by the compensation component 200 which has a compensation distance D. One end of the compensation component 200 is abutted on the first connecting portion 110. The engaging head 300 has a second connecting portion 310 being detachably disposed on the body 100, and the second connecting portion 310 is abutted on the other end of the compensation component 200. Therefore, a distance between the second connecting portion 310 and the first connection portion 110 is equal to the compensation distance D.

The second connecting portion 310 can be disposed to the body 100 by screwing, embedding or stressing. Conventionally, there exits many methods for disposing the second connecting portion 310 to the body 100, there is no more repeating. When the second connecting portion 310 is connected and fixed to the body 100, the compensation component 200 is abutted on the second connecting portion 310, and the first connecting portion 110 is abutted on the compensation component 200.

Figure 4A:
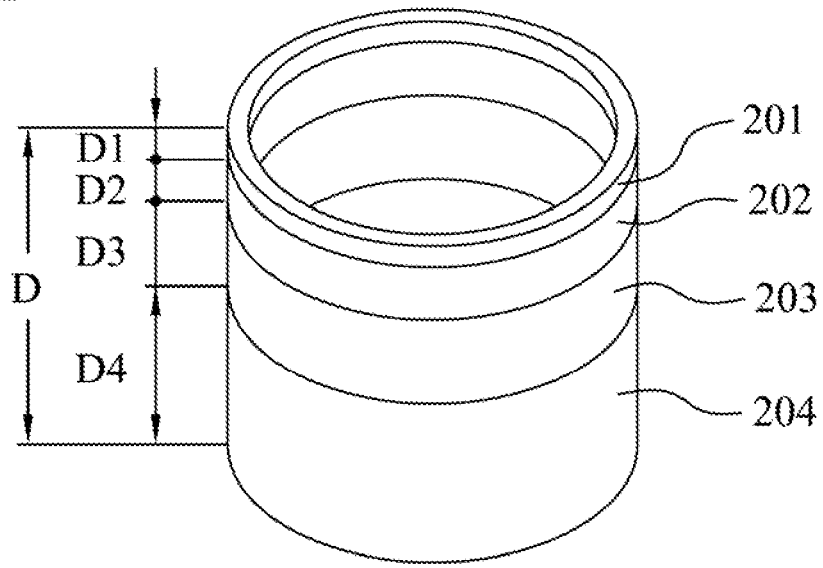
FIG. 4A is a structure diagram showing an example of the spring compensation structure of the present disclosure.
Figure 4B:
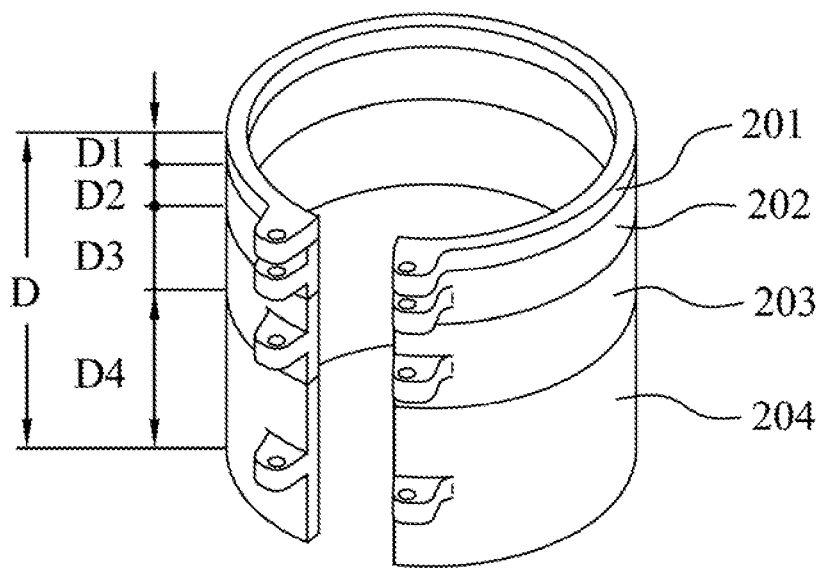
FIG. 4B is a structure diagram showing another example of the spring compensation structure of the present disclosure.

FIG. 4A and FIG. 4B are structure diagrams showing two examples of the spring compensation structure of the present disclosure. In FIG. 4A, a section of the compensation component 200 is ring-shaped. The compensation component 200 is formed by stacking a plurality of compensation units (201~204), each of the compensation units (201~204) has a compensation unit distance (D1~D4), where a sum of the compensation unit distances (D1~D4) is the compensation distance D of the compensation component 200. The quantity of the compensation units (201~204) is not limited. For example 2, 3, 4, 5, 7 or 9 compensation units can be used. The compensation unit distance D1~D4 can be the same or different from each other.

Referring to FIG. 4B, the difference between FIG. 4A and FIG. 4B is, the section of the compensation component 200 and the compensation units (201~204) is C-shaped. When each of the compensation units (201~204) is assembled or taken off, a blot can be used for connecting the engaging head 300 and the body 100, and it is unnecessary to totally depart the engaging head 300 and the body 100. Therefore, it is easier to remove and replace compensation units (201~204).

Figure 5:
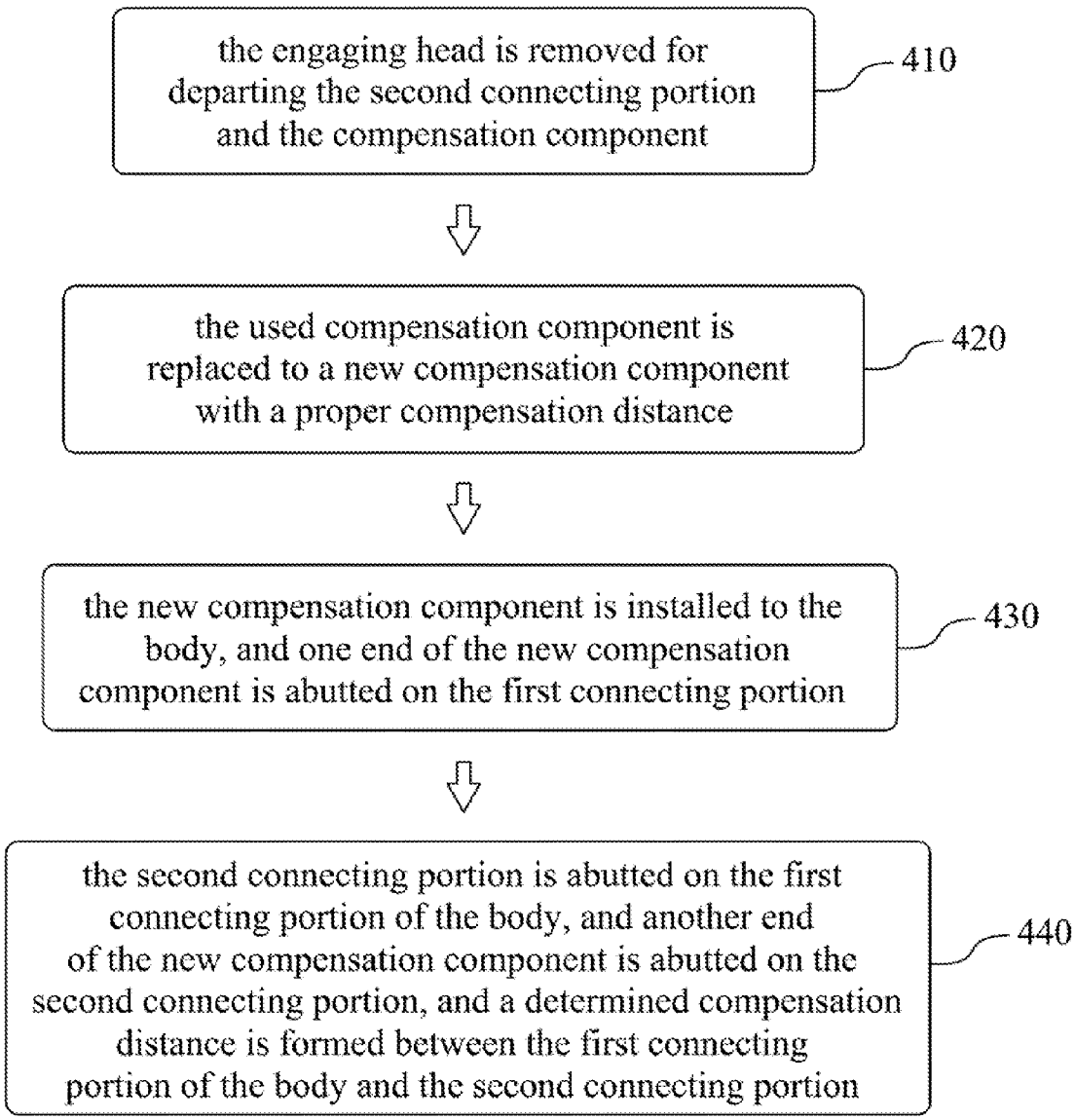
FIG. 5 is a flow chart showing a spring compensating method applied to the spring compensation structure of the present disclosure.

FIG. 5 is a flow chart showing a spring compensating method applied to the spring compensation structure of the present disclosure. In step 410, the engaging head is removed for departing the second connecting portion and the compensation component; in step 420, the used compensation component is replaced to a new compensation component with a proper compensation distance; in step 430, the new compensation component is installed to the body, and one end of the new compensation component is abutted on the first connecting portion; in step 440, the second connecting portion is abutted on the first connecting portion of the body, and another end of the new compensation component is abutted on the second connecting portion, and a determined compensation distance is formed between the first connecting portion of the body and the second connecting portion.

When a torque value of the torque wrench is not accurate, the spring compensating method can be applied, for example, the elastic force of the spring will be fatigued with the increasing using period, thus leading the inaccurate of the torque. At the time, according to FIG. 2 and FIG. 3, the used compensation component 200 can be replaced with a new compensation component 200 with a smaller compensation distance D to reduce the compensation distance D between the engaging head 300 and the body 100.

Another method to reduce the compensation distance D is disclosed in FIG. 4A and FIG. 4B. In FIGS. 4A and 4B, each of the compensation units (201~204) can be taken off or be replaced to a new one with a smaller compensation unit distance, where the sum of the compensation unit distances (201~204) is the compensation distance D, thus the compensation distance D is reduced. When the body 100 applies the same engaging force to the engaging head 300, the reduced compensation distance D leads to a reduction of a stimulated lever arm, thus the torque is reduced. A compensation effect will occur due to the smaller torque applied to the spring with fatigued elastic force, and an accurate torque value can be obtained.

The spring compensating method is not limited to be applied on the situation of elastic fatigue of the spring or the reduction of the compensation distance D, but also can be applied on the calibration of the torque value when a torque wrench is manufactured. When the torque value of to new made torque wrench is inaccurate, the spring compensating method can be applied to increase or reduce the compensation distance D, therefore a higher or a lower torque value can be compensated to a proper value.

In sum up, the present disclosure has advantages as follows:

a. The compensation component can be easily replaced for calibrating the torque value of the torque wrench.

b. It is unnecessary to open the inner structure of the torque wrench; therefore the accuracy of the inner structure of the torque wrench can be maintained.

c. The spring compensation structure is simple, thereby reducing the manufacturing cost of the torque wrench.

d. The spring compensating method is easily to be performed, thereby reducing the cost of the maintenance and repair of the torque wrench.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A spring compensation method applied to a spring compensation structure of a torque wrench, the spring compensation structure comprising a body, a compensation component and an engaging head, wherein the body has a first connecting portion, the compensation component is installed on the body and has a proper compensation distance, and one end of the compensation component is abutted on the first connecting portion of the body, the engaging head has a second connecting portion, the second connecting portion is detachably disposed on the body and being abutted on an other end of the compensation component, and a distance between the second connecting portion and the first connecting portion is equal to a determined compensation distance, the spring compensating method comprising:

departing the engaging head and separating the second connecting porting and the compensation component;

replacing the compensation component with another compensation component having the proper compensation distance;

installing the another compensation component to the body and abutting one end of the another compensation component on the first connecting portion of the body; and connecting the second connecting portion to the body and abutting another end of the another compensation component on the second connecting portion, and thereby forming the determined compensation distance between the second connecting portion and the first connecting portion of the body;

wherein a torque loss caused by elastic fatigue of the spring compensation structure of the torque wrench is compensated by the determined compensation distance.

2. The spring compensation method of claim 1, wherein the compensation component is formed by stacking a plurality of compensation units, each compensation unit having a compensation unit distance, and a sum of the compensation unit distance is the determined compensation distance.

3. The spring compensation method of claim 2, wherein the compensation unit di stance is 0.1, 1, 2, 5, or 10 mm.

4. The spring compensation method of claim 1, wherein a section of the compensation component is ring-shaped.

5. The spring compensation method of claim 1, wherein a section of the compensation component is C-shaped.

6. The spring compensation method of claim 1, wherein the second connecting portion is detachably disposed on the body by screwing, embedding or stressing.

\* \* \* \* \*